US006097731A

United States Patent [19]
Aoki

[11] Patent Number: 6,097,731
[45] Date of Patent: Aug. 1, 2000

[54] DATA RETRANSMISSION METHOD USED IN CONFIRMATION INFORMATION TRANSMISSIONS

[75] Inventor: Shigehide Aoki, Yokohama, Japan

[73] Assignee: NEC Corporation, Tokyo, Japan

[21] Appl. No.: 08/957,030

[22] Filed: Oct. 24, 1997

[30] Foreign Application Priority Data

Oct. 24, 1996 [JP] Japan ................................. 8-282662

[51] Int. Cl.[7] ............................. G06F 11/00; H04J 3/16
[52] U.S. Cl. ..................... 370/465; 370/469; 709/227; 709/231; 710/105
[58] Field of Search .................................. 370/231, 235, 370/389, 465, 469, 321; 709/230, 227, 249, 231, 232; 710/105, 238

[56] References Cited

U.S. PATENT DOCUMENTS

| 5,243,595 | 9/1993 | Woest et al. ............................. 709/231 |
| 5,430,710 | 7/1995 | Mueller et al. .......................... 370/469 |
| 5,502,712 | 3/1996 | Akita ....................................... 709/230 |
| 5,677,918 | 10/1997 | Tran et al. ............................... 370/321 |
| 5,790,553 | 8/1998 | Deaton, Jr. et al. ..................... 370/469 |

FOREIGN PATENT DOCUMENTS

| 92-92642 | 4/1987 | Japan . |
| 1-171346 | 7/1989 | Japan . |
| 2-116247 | 4/1990 | Japan . |
| 2-270432 | 11/1990 | Japan . |
| 4-42656 | 2/1992 | Japan . |
| 4-339442 | 11/1992 | Japan . |
| 5-183644 | 7/1993 | Japan . |
| 5-336151 | 12/1993 | Japan . |
| 8-65732 | 3/1996 | Japan . |
| 2 266 641 | 11/1993 | United Kingdom . |

OTHER PUBLICATIONS

"OSI—Computer Network for Tomorrow", by K. Tabata, et al., 1st Edition, published Sep. 8, 1998, Japanese Standards Association Inc., pp. 104–105 (See 3.2.6(4)"Sequence Nos." section and pp. 133–135 (3.3.5(2) "Data Transfer and Error Control" sequence control).

Primary Examiner—Ajit Patel
Assistant Examiner—Afsar M. Qureshi
Attorney, Agent, or Firm—Scully, Scott, Murphy & Presser

[57] ABSTRACT

A data retransmission method for a confirmation information transmission is provided which improves reliability of information transmission by preventing the loss of data when a transmission of data from layer 3 fails in layer 2. When transmitting layer-3-data from layer 3 to layer 2, layer 2 initiates timer observation and simultaneously transmits confirmation data to layer 1. If this transmission fails, a reply from layer 1 cannot be received and a retransmission procedure also fails, layer 2 notifies layer 3 of transmission failure, and simultaneously discards the layer-3-data. Layer 3 retransmits to layer 2 the layer-3-data which it previously transmitted, and layer 2 again transmits confirmation data to layer 1. If this transmission succeeds, layer 2 terminates the timer observation and notifies layer 3 of the successful transmission.

9 Claims, 4 Drawing Sheets

DATA RETRANSMISSION METHOD USED IN CONFIRMATION INFORMATION TRANSMISSIONS

BACKGROUND OF THE INVENTION

1. Field of the Invention

The present invention relates to data retransmission method for confirmation information transmissions which may be used for example in communication systems which use communication protocols of OSI (Open Systems Interconnection) reference models. In particular, the present invention relates to a communication confirmation process for a confirmation information transmission service, and this process occurs between layer 2 (the data link layer) and layer 3 (the network layer) when a data transmission in layer 2 is lost. This application is based on patent application No. Hei 8-282662 filed in Japan, the content of which is incorporated herein by reference.

2. Description of the Related Art

As one communication protocol related to OSI reference models, there is "confirmation information transmission services" which confirm delivery of information transmitted by layer 2, and this is in contrast to "non-confirming information transmission services" which do not confirm delivery of transmitted information. In this confirmation information transmission service, a function for data retransmission during transmission is regulated in layer 2 for situations in which information transmission fails.

As a standard for regulating confirmation information transmission services, for example, there is the digital automobile system standards RCR STD-27D (refer to "The Digital Automobile System Standard Standards RCR STD-27D" Incorporated Foundation of the Radio Wave System Development Center, Jun. 27, 1995, Publication, pages 119~120).

Under this standard, in order to transmit data from layer 3 to layer 2, primitives called "DL-Data Requests" and "DL-Data Displays" are regulated, and, by using these primitives, data transmission has been realized. Here, the "DL-Data Request" primitive is used for requesting the transmission of a message using a process of the confirmation information transmission service. In addition, the "DL-Data Display" primitive is for the purpose of indicating the arrival of a received message using the confirmation information transmission service. In this way, in the above-mentioned standard, with regard to data transmission from layer 3 to layer 2, there is no regulation at all of primitives for the purpose of conducting confirmation of delivery of transmitted information.

FIG. 3 shows the structure of layers in the OSI reference model. The information receiving side and transmitting side each have a layer 1, a layer 2 and a layer 3. Here, layer 1 is a physical layer for carrying out electrical and physical control. Communication layer 2 is a data link layer and carries out transmission of layer-3-data in the logic link layers. Layer 3 is the network layer and carries out call control such as call setting and call release. In addition, the interface LI between layers regulates the method of data transmission between layer 2 and layer 3. Moreover, in the OSI reference model, there may be a plurality of layers having positions higher than layer 3, but since they have no direct relationship with the present invention, these higher position layers are not shown in FIG. 3.

Next, with reference to FIG. 4, a data retransmission method relating to a confirmation information transmission which uses related art will be explained.

Firstly, at time t1, Data D1 (layer-3-data) is transmitted from layer 3 to layer 2. If this is done, at time t2, layer 2 begins timer observations for the purpose of detecting the loss of the transmission, and simultaneously transmits data ("confirmation data" in the Figure) to layer 1. If this transmission is successful, at time t3, layer 1 returns a reply corresponding to this transmission to layer 2. When this reply is received by layer 2, at time t4, layer 2 recognizes that the transmission to layer 1 has been successful and the timer observation which began at time t2 is terminated.

Next, at time t5, Data D2 which is different from Data D1 is transmitted from layer 3 to layer 2. If this is done, in the same way as mentioned above, layer 2 begins timer observation at time t6 and simultaneously transmits confirmation data to layer 1. Then, if transmission of data from layer 2 to layer 1 fails, layer 2 cannot receive a response to this transmission from layer 1. Due to this, layer 2 recognizes that the transmission of data has failed by means of the timer observation, then a procedure for retransmission of the confirmation data is carried out. Then, if this retransmission procedure also fails, at time t7, layer 2 discards the Data D2 which was transmitted from layer 3. In addition, at this time, by means of resetting itself, layer 2 shifts to a condition in which the link is not established. When these procedures are completed, the condition of layer 2 returns to the normal condition, and transmission of data becomes possible again.

Next, at time t8, if data D3 is transmitted from layer 3 to layer 2, in the same way as mentioned above, at time t9, layer 2 begins timer observation and transmits confirmation data to layer 1. Then, in the same way as in the transmission of D1, if the transmission of data D3 is successful, layer 1 returns a reply to layer 2 at time t10. By means of this, at time t11, layer 2 recognizes the success of the transmission and timer observation is terminated.

In the above-mentioned way, layer 3 recognizes the transmission of Data D1, Data D2 and Data D3 as all being complete. However, in reality, the Data D2 which failed in transmission was discarded in layer 2. As a result, for the layer-3-data receiving side (FIG. 3), Data D2 remains lost, and only Data D1 and data D3 have been received.

In other words, in the data retransmission method of the related art, with regard to situations in which the retransmission procedures of layer 2 fail, there is no consideration whatsoever to an error recovery process in which, for example, layer 3 which is a higher position layer carries out retransmission. For this reason, when the retransmission process conducted in layer 2 fails, layer 2 is left in a condition in which data has been discarded, loss of data occurs, and this is a big problem with regard to reliability.

SUMMARY OF THE INVENTION

An object of the present invention is the provision of a data retransmission method for use in confirmation information transmissions, and with which it is possible to improve the reliability of information transmissions by preventing the loss of data even when the transmission of layer-3-data fails in layer 2.

Consequently, the present invention comprises a transmission confirmation process for confirming the transmission of layer-3-data between layer 2 of an OSI reference model and layer 3 of the above-mentioned OSI reference model. The above-mentioned transmission process comprises sending from the above-mentioned layer 2 to the above-mentioned layer 3, in accordance with said transmission confirmation process, notification of a failure of a confirmation information transmission for the above-mentioned layer-3-data which occurs in the above-mentioned layer 2, and simultaneously discarding the above-mentioned layer-3-data in the above-mentioned layer 2; retransmitting the above-mentioned layer-3-data from the above-mentioned layer 3 to the above-mentioned layer 2; and transmitting again a confirmation information transmission for the above-mentioned layer-3-data in the above-mentioned layer 2.

In addition, the present invention is a data retransmission method used in confirmation information transmissions comprising transmitting layer-3-data from layer 3 of an OSI reference model to layer 2 of the above-mentioned OSI reference model; transmitting a confirmation information transmission for the above-mentioned layer-3-data from the above-mentioned layer 2 to layer 1 of the above-mentioned OSI reference model; notifying a transmission result of the above-mentioned confirmation information transmission to the above-mentioned layer 3 from the above-mentioned layer 2 while simultaneously discarding the above-mentioned layer-3-data in the above-mentioned layer 2 when the above-mentioned confirmation information transmission fails; detecting that said notified transmission result indicates transmission failure; retransmitting the above-mentioned layer-3-data from the above-mentioned layer 3 to the above-mentioned layer 2; and transmitting again a confirmation information transmission for the above-mentioned layer-3-data from the above-mentioned layer 2 to the above-mentioned layer 1 using the above-mentioned layer-3-data retransmitted from the above-mentioned layer 3.

In addition, the present invention is a data retransmission method used in confirmation information transmissions comprising transmitting layer-3-data from layer 3 of an OSI reference model to layer 2 of the above-mentioned OSI reference model; initiating an observation operation for detecting transmission failure of the above-mentioned layer-3-data in the above-mentioned layer 2, while simultaneously transmitting a confirmation information transmission for the above-mentioned layer-3-data to layer 1 of the above-mentioned OSI reference model; retransmitting the above-mentioned layer-3-data from the above-mentioned layer 2 to the above-mentioned layer 1 when failure of confirmation information transmission for the above-mentioned layer 1 is detected by means of the above-mentioned observation operation; discarding the above-mentioned layer-3-data in the above-mentioned layer 2 when failure of retransmission of the above-mentioned layer-3-data is detected, while simultaneously sending notification of transmission failure from the above-mentioned layer 2 to the above-mentioned layer 3; detecting notification of the above-mentioned transmission failure and retransmitting the above-mentioned layer-3-data from the above-mentioned layer 3 to the above-mentioned layer 2; initiating the above-mentioned observation operation in the above-mentioned layer 2, while simultaneously again transmitting, from the above-mentioned layer 2 to the above-mentioned layer 1, a confirmation information transmission for the above-mentioned layer-3-data based on the above-mentioned layer-3-data retransmitted from the above-mentioned layer 3; and terminating the above-mentioned observation operation in the above-mentioned layer 2 when the above-mentioned confirmation information transmission is successful, while simultaneously notifying transmission success to the above-mentioned layer 3.

Then, by means of the present invention, layer 3 can manage the success or failure of transmissions of data while preventing the loss of data in layer 3, and improving the reliability of information transmissions.

DESCRIPTION OF PREFERRED EMBODIMENTS

In one embodiment of the present invention, in order to recover an error in which a transmission of layer-3-data fails in layer 2, a data retransmission function is provided in layer 3, while a "transmission success or failure notification" primitive for carrying out confirmation of the success or failure of a data transmission in layer 2 is newly provided as an interface LI between layers.

Figure 2:
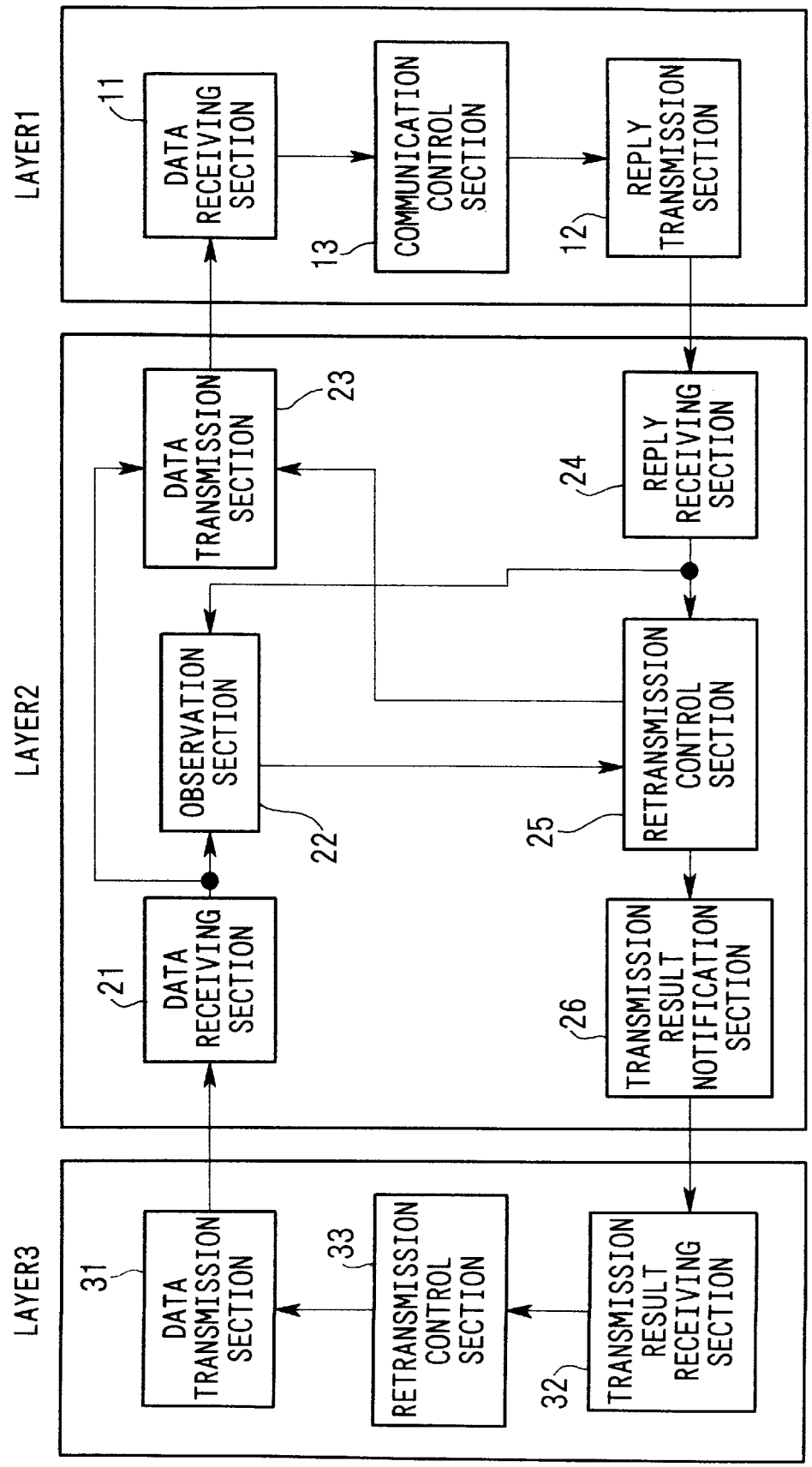
FIG. 2 is a block diagram showing the layer structure of the OSI reference model for the same embodiment as shown in FIG. 1.

Here, the structure of each layer in the transmission side is shown in FIG. 2. As shown in the same Figure, layer 1 has a data receiving section 11, a reply transmission section 12, and a communication control section 13. In addition, layer 2 has a data receiving section 21, an observation section 22, a data transmission section 23, a reply receiving section 24, a retransmission control section 25, and a transmission result notification section 26. Furthermore, layer 3 has a data transmission section 31, a transmission result receiving section 32 and a retransmission control section 33. Moreover, the function of each of these sections will be made clear in the explanation of operations stated below.

Figure 1:
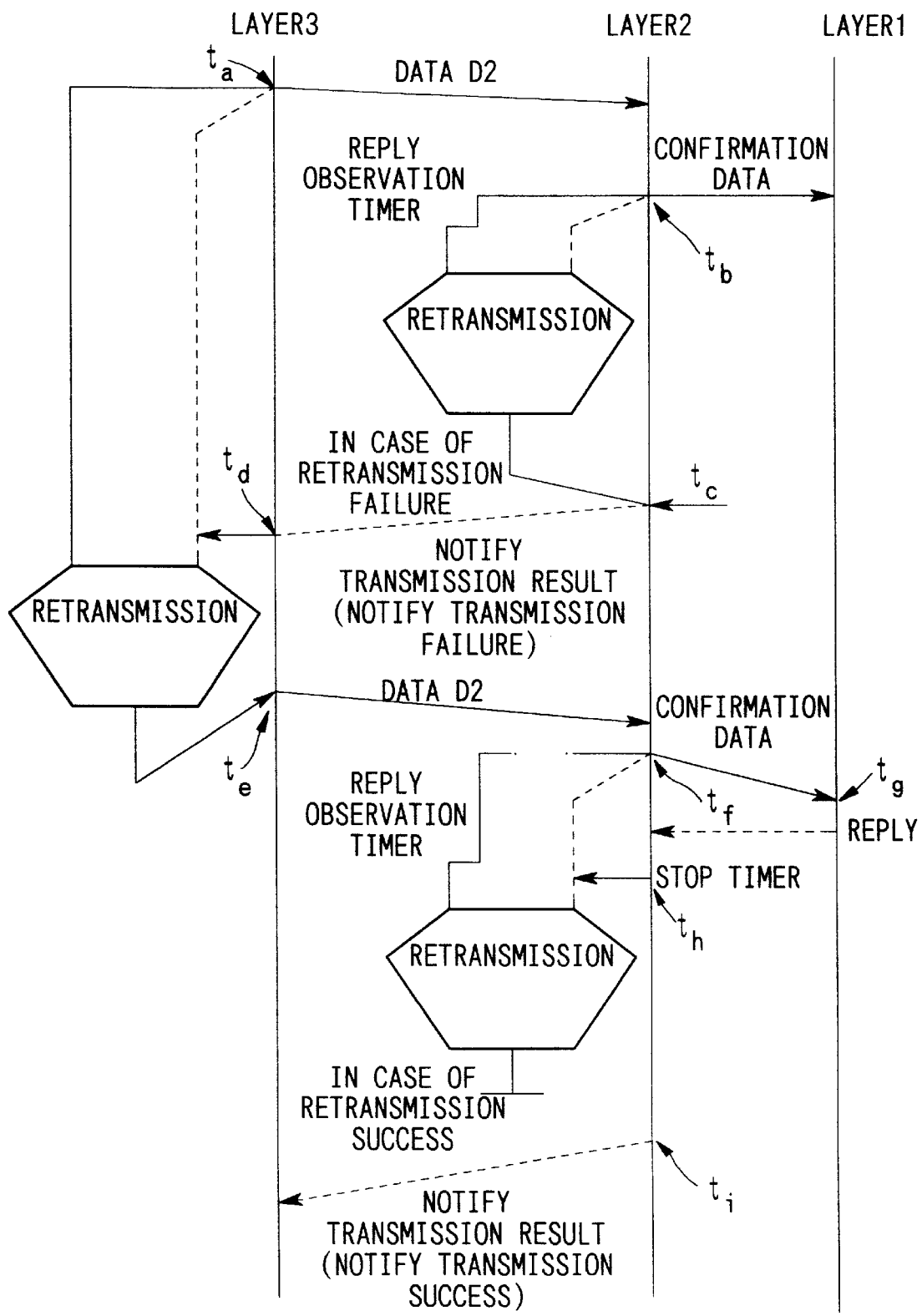
FIG. 1 is a timing chart showing the processes of a data retransmission method for confirmation information transmissions according a one embodiment of the present invention.
Figure 4:
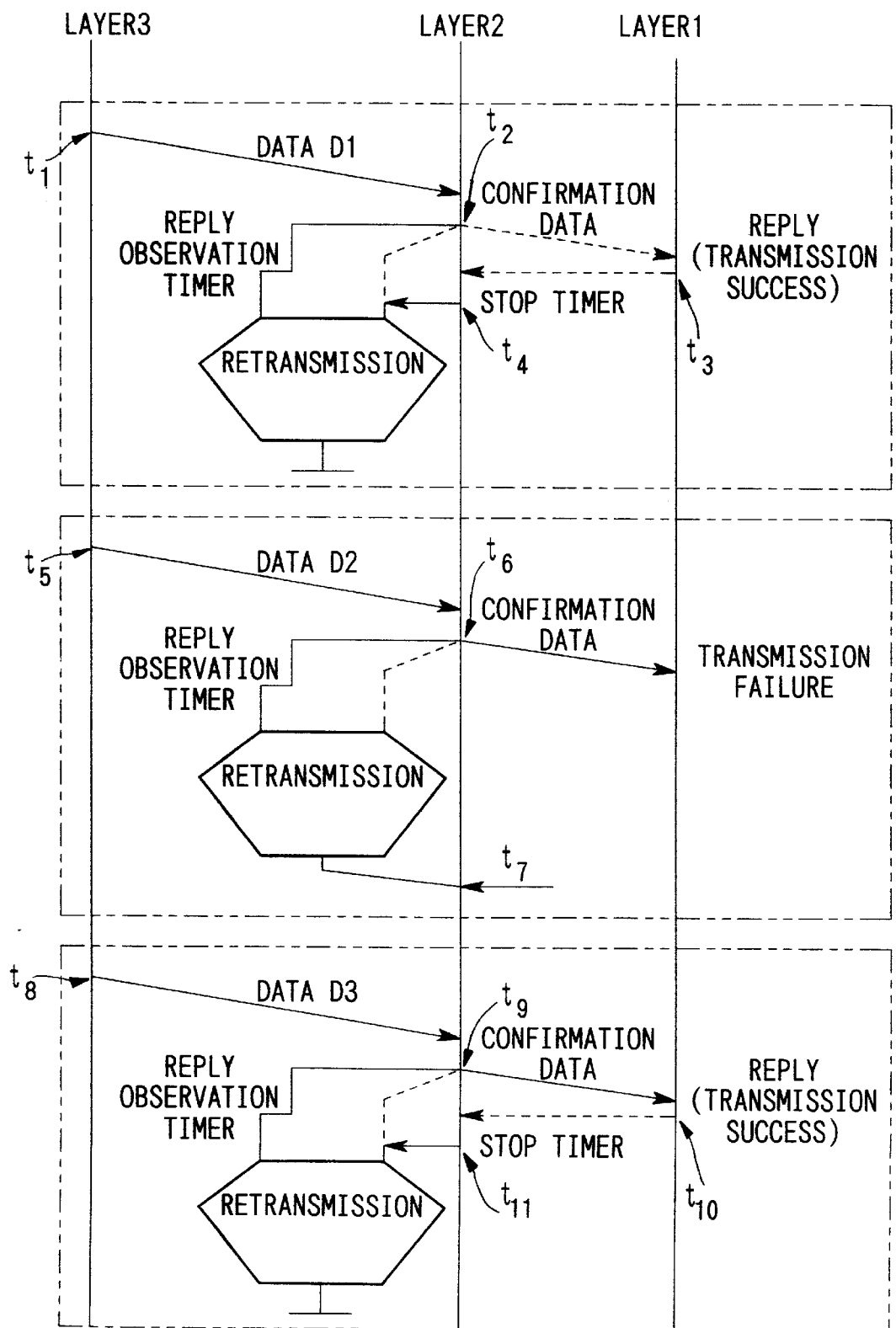
FIG. 4 is a timing chart showing the processes of a data retransmission method for confirmation information transmissions according to the related art.

Next, with reference to FIG. 1, the data retransmission method for confirmation information transmissions according to the present embodiment will be explained. Here, the transmission processes (FIG. 4) for Data D1 and Data D3 according to the present embodiment are the same as those explained for the related art. Accordingly, in the following, from among the data transmission processes related to Data D1 to Data D3, an explanation will only be given with regard to the transmission process for Data D2 for which a data retransmission function is carried out.

Firstly, at time ta, Data D2 is transmitted from data transmission section 31 of layer 3 to data receiving section 21 of layer 2. If this takes place, at time tb, in layer 2, observation section 22 begins timer observation with the reception of data by data receiving section 21 as the stimulus, and simultaneously data transmission section 23 transmits confirmation data to data receiving section 11 of layer 1.

Figure 3:
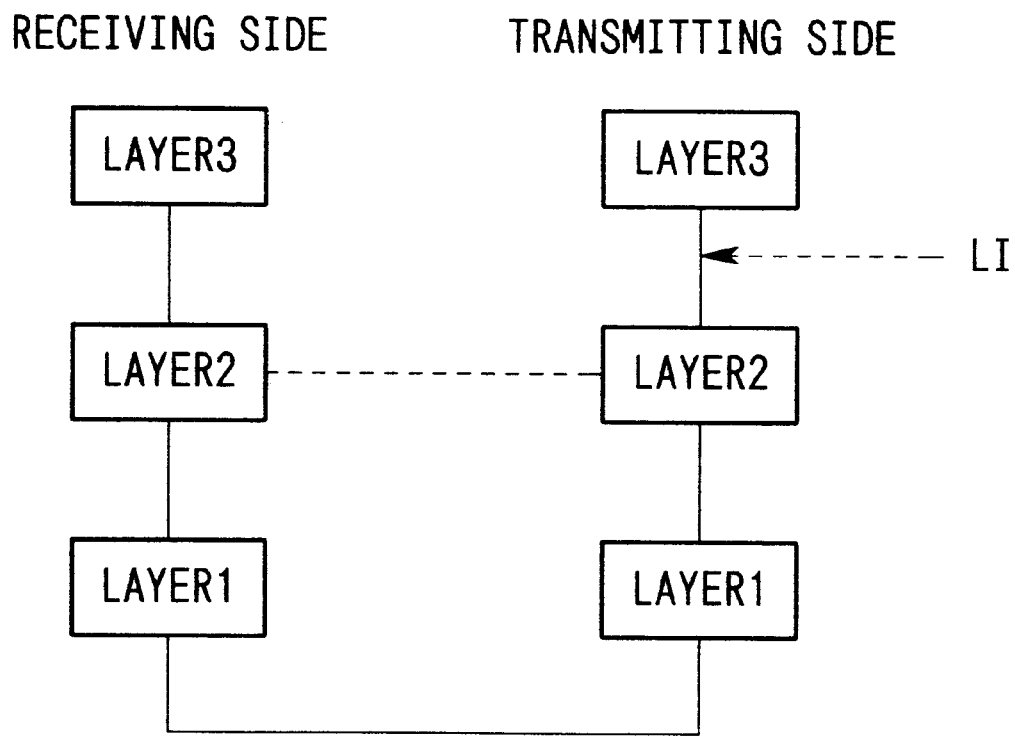
FIG. 3 is a block diagram showing the structure of layers for an OSI reference model.

If this is done, in layer 1, communication control section 13 carries out a transmission process for data received by data receiving section 11 between the reception side (see FIG. 3) and the communication control section 13 itself. When this transmission fails and it is not possible for reply receiving section 24 of layer 2 to receive the reply responding to the above-mentioned transmission from the reply transmission section 12 of layer 1, the observation section 22 which detects this notifies retransmission control section 25 of the transmission failure. By means of this, the retransmission control section 25 retransmits confirmation data to data receiving section 11 of layer 1 via data transmission section 23.

Then, when observation section 22 detects that this retransmission process has failed, this failure is notified to transmission result notification section 26 through retransmission control section 25. If this is done, at time tc, the transmission result notification section 26 notifies that the transmission of Data D2 failed by sending out a transmission success or failure notice to transmission result receiving section 32 of layer 3. In addition, at this time, in layer 2, in accordance with an instruction from retransmission control section 25, data transmission section 23 discards Data D2, the transmission of which failed.

Next, at time td, the retransmission control section 33 of layer 3 receives transmission success or failure notification from layer 2 via transmission result receiving section 32, and recognizes the failure of the transmission of Data D2. Next, at time te, retransmission control section 33 instructs data transmission section 31, and Data D2, which was discarded by layer 2, is transmitted again to the data receiving section 21 of layer 2. By means of this, in layer 2, at time tf, observation section 22 begins timer observation again, and at the same time, data transmission section 23 transmits confirmation data to data receiving section 11 of layer 1. If this transmission is successful and transmission success is reported to reply transmission section 12 from communication control section 13, at time tg, reply transmission section 12 returns a reply to the reply receiving section 24 of layer 2.

By means of this, in layer 2, the retransmission control section 25 recognizes the success of the of the retransmission process of data via reply receiving section 24, and at the same time, notifies that success to transmission result notification section 26. In addition, at time th, the observation section 22 which has been notified of transmission success from reply receiving section 24 terminates timer observation. After that, at time ti, the transmission result notification section 26 notifies layer 3 of the success of the transmission of Data D2 by sending transmission success or failure notification to the transmission result receiving section 32 of layer 3.

In the above way, by means of the present embodiment, the loss of Data D2 in layer 3 which is a problem for the conventional art is solved.

What is claimed is:

1. A data retransmission method for use in confirmation information transmissions comprising
    a transmission confirmation process for confirming the transmission of layer-3-data between layer 2 of an OSI reference model and layer 3 of said OSI reference model,
    wherein said transmission confirmation process comprises:
        sending from said layer 2 to said layer 3, in accordance with said transmission confirmation process, notification of a failure of a confirmation information transmission for said layer-3-data which occurs in said layer 2, and simultaneously discarding said layer-3-data in said layer 2;
        retransmitting said layer-3-data from said layer 3 to said layer 2, and
        transmitting again a confirmation information transmission for said layer-3-data in said layer 2.

2. A data retransmission method used in confirmation information transmissions according to claim 1, wherein said notification of a failure of said confirmation information transmission is conducted using a primitive.

3. A data retransmission method used in confirmation information transmissions comprising:
    transmitting layer-3-data from layer 3 of an OSI reference model to layer 2 of said OSI reference model;
    transmitting a confirmation information transmission for said layer-3-data from said layer 2 to layer 1 of said OSI reference model;
    notifying a transmission result of said confirmation information transmission to said layer 3 from said layer 2 while simultaneously discarding said layer-3-data in said layer 2 when said confirmation information transmission fails;
    detecting that said notified transmission result indicates transmission failure;
    retransmitting said layer-3-data from said layer 3 to said layer 2; and
    transmitting again a confirmation information transmission for said layer-3-data from said layer 2 to said layer 1 using said layer-3-data retransmitted from said layer 3.

4. A data retransmission method used in confirmation information transmissions according to claim 3, wherein said notification of a transmission result of said confirmation information transmission is conducted using a primitive.

5. A data retransmission method used in confirmation information transmissions comprising:
    transmitting layer-3-data from layer 3 of an OSI reference model to layer 2 of said OSI reference model;
    initiating an observation operation for detecting transmission failure of said layer-3-data, in said layer 2, while simultaneously transmitting a confirmation information transmission for said layer-3-data to layer 1 of said OSI reference model;
    retransmitting said layer-3-data from said layer 2 to said layer 1 when failure of confirmation information transmission for said layer 1 is detected by means of said observation operation;
    discarding said layer-3-data in said layer 2 when failure of retransmission of said layer-3-data is detected, while simultaneously sending notification of transmission failure from said layer 2 to said layer 3;
    detecting notification of said transmission failure and retransmitting said layer-3-data from said layer 3 to said layer 2;
    initiating said observation operation in said layer 2, while simultaneously again transmitting, from said layer 2 to said layer 1, a confirmation information transmission for said layer-3-data based on said layer-3-data retransmitted from said layer 3; and
    terminating said observation operation in said layer 2 when said confirmation information transmission is successful, while simultaneously notifying transmission success to said layer 3.

6. A data retransmission method used in confirmation information transmissions according to claim 5, wherein said notification of transmission failure from said layer 2 to said layer 3 uses a primitive.

7. A data retransmission method used in confirmation information transmissions according to claim 5, wherein said notification of transmission success from said layer 2 to said layer 3 uses a primitive.

8. A data retransmission method used in confirmation information transmissions according to claim 5, wherein said observation operation is conducted using a timer observation.

9. A data retransmission method used in confirmation information transmissions according to claim 5, wherein said layer 3 data is retransmitted from said layer 2 to said layer 1 using a retransmission function regulated by Digital Automobile Systems Standards Standard RCR STD-27D.

* * * * *

UNITED STATES PATENT AND TRADEMARK OFFICE
CERTIFICATE OF CORRECTION

PATENT NO. : 6,097,731            Page 1 of 1
DATED : August 1, 2000
INVENTOR(S) : S. Aoki It is certified that error appears in the above-identified patent and that said Letters Patent is hereby corrected as shown below:

<u>Column 5,</u>
Line 20, delete the 2nd instance of -- of the --

Signed and Sealed this

Twenty-sixth Day of February, 2002

Attest:

JAMES E. ROGAN
*Attesting Officer*     *Director of the United States Patent and Trademark Office*